No. 766,463. PATENTED AUG. 2, 1904.
H. A. PALMER.
PNEUMATIC TIRE.
APPLICATION FILED FEB. 15, 1904.
NO MODEL.
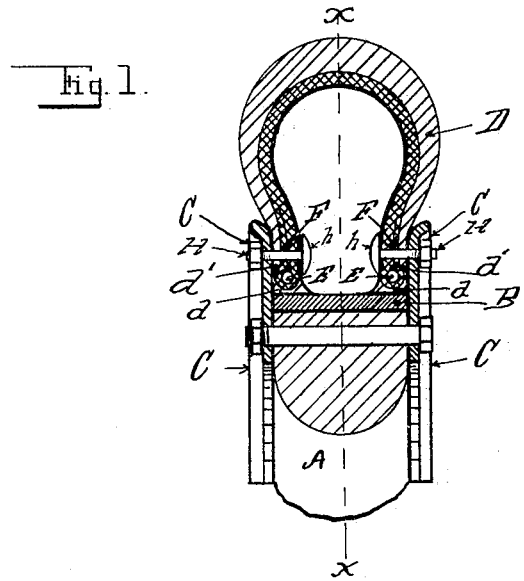
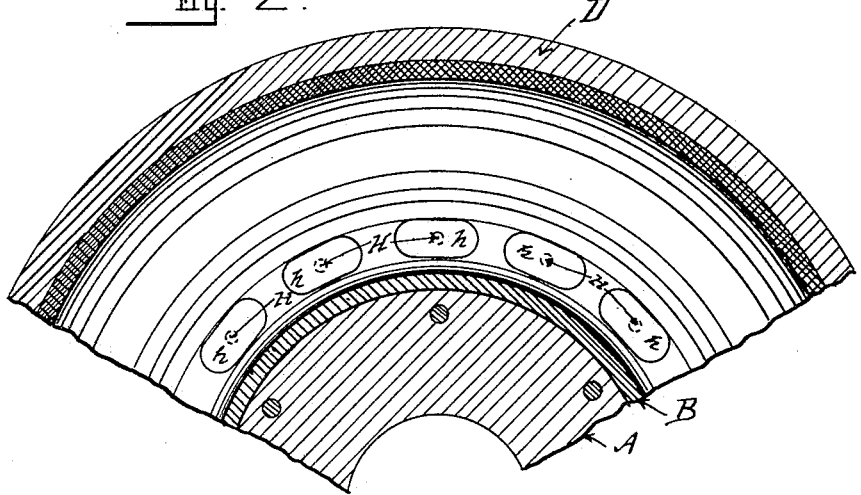
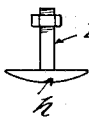
Witnesses.
F. J. Bassett
G. J. Mead
Inventor
Harry A. Palmer
By J. C. & H. M. Sturgeon
Att'ys No. 766,463.　　　　　　　　　　　　　　　　　　　　　　　Patented August 2, 1904.

UNITED STATES PATENT OFFICE.

HARRY A. PALMER, OF ERIE, PENNSYLVANIA.

PNEUMATIC TIRE.

SPECIFICATION forming part of Letters Patent No. 766,463, dated August 2, 1904.

Application filed February 15, 1904. Serial No. 193,669. (No model.)

*To all whom it may concern:*

Be it known that I, HARRY A. PALMER, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to pneumatic tires and mechanism for securing the tire-sheath to vehicle-wheels; and it consists substantially in improvements of the devices embodied in my application for Letters Patent, Serial No. 181,074, filed November 13, 1903, for improvements in vehicle-tires.

The object of this invention is to construct a pneumatic tire-sheath having an opening or slit around its inner face, through which access may be had to the interior of the sheath, and with reinforcing-strips in the sides of the inner face thereof, so that bolts or rivets having broad flat heads bearing against the sides of the tire-sheath may be passed through holes in the sides of the sheath above the reinforcing-strip therein and through radial flanges on the wheel-rim, so that the sides of the tire-sheath can be firmly clamped against the inner faces of the flanges, and thereby secured in place on the wheel-rim, yet can be quickly and readily removed when necessary.

The features of my invention are hereinafter fully set forth and described, and illustrated in the accompanying drawings, in which—

Figure 1 is a transverse section of a pneumatic tire-sheath and wheel-rim embodying my invention. Fig. 2 is a section thereof on the line $x$ $x$ in Fig. 1. Fig. 3 is a view of one of the broad-headed clamping-bolts.

In the drawings illustrating my invention, A designates a wheel-felly, B a metal tire thereon, and C C radial flanges removably secured to the sides of the wheel-felly, so as to form a channel on the periphery of the wheel.

D is a pneumatic tire-sheath made of the usual outer resilient covering and inner layers of fabric to reinforce and strengthen the casing sufficiently to resist the pressure of air exerted thereon when the inner tube is in place therein and inflated for use. In the inner faces $d$ $d$ of the sides of this tire-sheath I mold and vulcanize in place therein reinforcing-strips E E, consisting of rings of wire, wire cord, or other suitable material, and through the sides $d'$ $d'$ of the tire-sheath I make bolt or rivet holes F F, in which I insert bolts or rivets H, (see Fig. 3,) having, preferably, thin flat oblong heads $h$ thereon, so as to afford large bearing-surfaces therefor against the tire-sheath, which bolts or rivets pass through holes in the radial flanges C C, so that the sides of the tire-sheath are firmly secured thereto. It will be seen that I am enabled thus to secure the tire-sheath firmly in the channel on the rim of the vehicle-wheel and at the same time access can readily be had to the interior of the sheath either by removing the bolts H on one side or by removing one of the flange-rings C from the wheel.

Having thus shown and described my invention, so as to enable others to construct and utilize the same, what I claim as new, and desire to secure by Letters Patent of the United States, is—

1. The combination in a pneumatic vehicle-tire, of a wheel, removable channel-flanges on the wheel-rim, a tire-sheaf open on its inner face adapted to fit into the channel on the wheel-rim, reinforcing-strips in the sides of the tire-sheath, and means for securing the sides of the tire to the inner faces of the channel-flanges, substantially as set forth.

2. The combination in a pneumatic vehicle-tire, of a wheel, removable channel-flanges secured to the sides of the rim of said wheel, a tire-sheath open on its inner face and adapted to fit into the channel on the wheel-rim, reinforcing-strips in the sides of the tire-sheath near the inner face thereof and bolts or rivets passing through the sides of the tire-sheath above the reinforcing-strips therein and through holes in the channel-flanges, and thin flat heads on said bolts or rivets adapted to engage the sides of the tire-sheath whereby the sides of the tire-sheath can be firmly clamped to the inner faces of the channel-flanges, substantially as set forth.

In testimony whereof I affix my signature in presence of two witnesses.

HARRY A. PALMER.

Witnesses:
HAROLD M. STURGEON,
F. J. BASSETT.